US012802572B2

(12) United States Patent
Watanabe et al.

(10) Patent No.: US 12,802,572 B2
(45) Date of Patent: Nov. 17, 2026

(54) INFORMATION PROCESSING DEVICE, MOBILE BODY CONTROL SYSTEM, AND INFORMATION PROCESSING METHOD

(71) Applicant: Mitsubishi Electric Corporation, Tokyo (JP)

(72) Inventors: Misato Watanabe, Tokyo (JP); Miki Arai, Tokyo (JP); Takayasu Hashimoto, Tokyo (JP); Yuri Kubota, Tokyo (JP); Dongsuk Park, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 51 days.

(21) Appl. No.: 18/973,164

(22) Filed: Dec. 9, 2024

(65) Prior Publication Data

US 2025/0104564 A1 Mar. 27, 2025

Related U.S. Application Data

(63) Continuation of application No. PCT/JP2022/025636, filed on Jun. 28, 2022.

(51) Int. Cl.
*G08G 1/00* (2006.01)
*B60W 50/14* (2020.01)

(52) U.S. Cl.
CPC ............... *G08G 1/22* (2013.01); *B60W 50/14* (2013.01); *B60W 2050/146* (2013.01); *B60W 2540/215* (2020.02); *B60W 2540/227* (2020.02)

(58) Field of Classification Search
CPC ........... G08G 1/00; G08G 1/22; B60W 50/14; B60W 2050/146; B60W 2540/213; B60W 2540/227; B60W 2540/215

(Continued)

(56) References Cited

U.S. PATENT DOCUMENTS 9,792,822 B2 * 10/2017 Hiroma ................. B60W 50/14
2016/0267796 A1 9/2016 Hiroma et al.

(Continued)

FOREIGN PATENT DOCUMENTS

JP 2001-216069 A 8/2001
JP 2010-146428 A 7/2010

(Continued)

OTHER PUBLICATIONS

International Search Report and Written Opinion mailed on Aug. 9, 2022, received for PCT Application PCT/JP2022/025636, filed on Jun. 28, 2022, 9 pages including English Translation.

*Primary Examiner* — Andrew Joseph Rudy

(74) *Attorney, Agent, or Firm* — XSENSUS LLP

(57) ABSTRACT

An information processing device that controls coupling between mobile bodies includes processing circuitry configured to: acquire mobile body position information of the mobile bodies and occupant detection information of states of occupants in the mobile bodies; determine communication target occupants from among the occupants in each of the mobile bodies on a basis of the occupant detection information; prepare a movement plan in which the mobile bodies are coupled at a passenger position where the communication target occupants face each other or face diagonally; and couple the mobile bodies by outputting mobile body control information for moving the mobile bodies in accordance with the movement plan to the mobile bodies.

12 Claims, 17 Drawing Sheets

(58) Field of Classification Search
USPC .............................................................. 701/36
See application file for complete search history.

(56) References Cited

U.S. PATENT DOCUMENTS

| | | | | |
|---|---|---|---|---|
| 2020/0117217 | A1* | 4/2020 | Yuzawa | G06Q 10/0833 |
| 2023/0123723 | A1* | 4/2023 | Kim | G06F 3/013<br>701/36 |
| 2025/0076887 | A1* | 3/2025 | Watanabe | G05D 1/43 |

FOREIGN PATENT DOCUMENTS

| | | | |
|---|---|---|---|
| JP | 2018-094955 | A | 6/2018 |
| JP | 2020-135028 | A | 8/2020 |
| WO | 2015/068501 | A1 | 5/2015 |
| WO | 2018/229871 | A1 | 12/2018 |

* cited by examiner

INFORMATION PROCESSING DEVICE, MOBILE BODY CONTROL SYSTEM, AND INFORMATION PROCESSING METHOD

CROSS-REFERENCE TO RELATED APPLICATION

This is a continuation application of PCT/JP2022/025636, filed on Jun. 28, 2022, the entire contents of which are incorporated herein by reference in their entirety.

TECHNICAL FIELD

The present disclosure relates to an information processing device, a mobile body control system, and an information processing method.

BACKGROUND ART

In recent years, various uses for a self-driving vehicle have been sought, and not only a use for causing vehicles to individually travel but also a use for causing a plurality of vehicles to travel in cooperation has been proposed. For example, Patent Literature 1 describes a traffic system in which an entrance of a first mobile body and an entrance of a second mobile body are coupled by synchronized travel of the first mobile body and the second mobile body. Since the entrances are coupled, an occupant can smoothly move or transfer between the mobile bodies.

CITATION LIST

Patent Literature

Patent Literature 1: JP 2018-094955 A

SUMMARY OF INVENTION

Technical Problem

Conventionally, there has been a problem that occupants cannot directly communicate with each other between traveling vehicles.

By the way, the traffic system disclosed in Patent Literature 1 couples entrances for the purpose of movement or transfer of an occupant between mobile bodies, and the occupants cannot directly communicate with each other between the mobile bodies.

The present disclosure solves the above problem, and an object of the present disclosure is to obtain an information processing device, a mobile body control system, and an information processing method that make direct communication between occupants possible between mobile bodies.

Solution to Problem

An information processing device according to the present disclosure is an information processing device that controls coupling between mobile bodies, and includes processing circuitry configured to: acquire mobile body position information of the mobile bodies and occupant detection information of states of occupants in the mobile bodies; determine communication target occupants from among the occupants in each of the mobile bodies on a basis of the occupant detection information; prepare a movement plan in which the mobile bodies are coupled at a passenger position where the communication target occupants face each other or face diagonally; and couple the mobile bodies by outputting mobile body control information for moving the mobile bodies in accordance with the movement plan to the mobile bodies.

Advantageous Effects of Invention

According to the present disclosure, mobile body position information of a mobile body and occupant detection information are acquired, communication target occupants are determined from among the occupants in each of the mobile bodies on the basis of the occupant detection information, a movement plan in which the mobile bodies are coupled at a passenger position where the communication target occupants face each other or face diagonally is prepared; and the mobile bodies are coupled by moving the mobile bodies in accordance with the movement plan. In the information processing device according to the present disclosure, the occupants can directly communicate with each other between the mobile bodies because the communication target occupants are located at positions where the communication target occupants can easily communicate with each other when the mobile bodies are coupled.

DESCRIPTION OF EMBODIMENTS

First Embodiment

Figure 1:
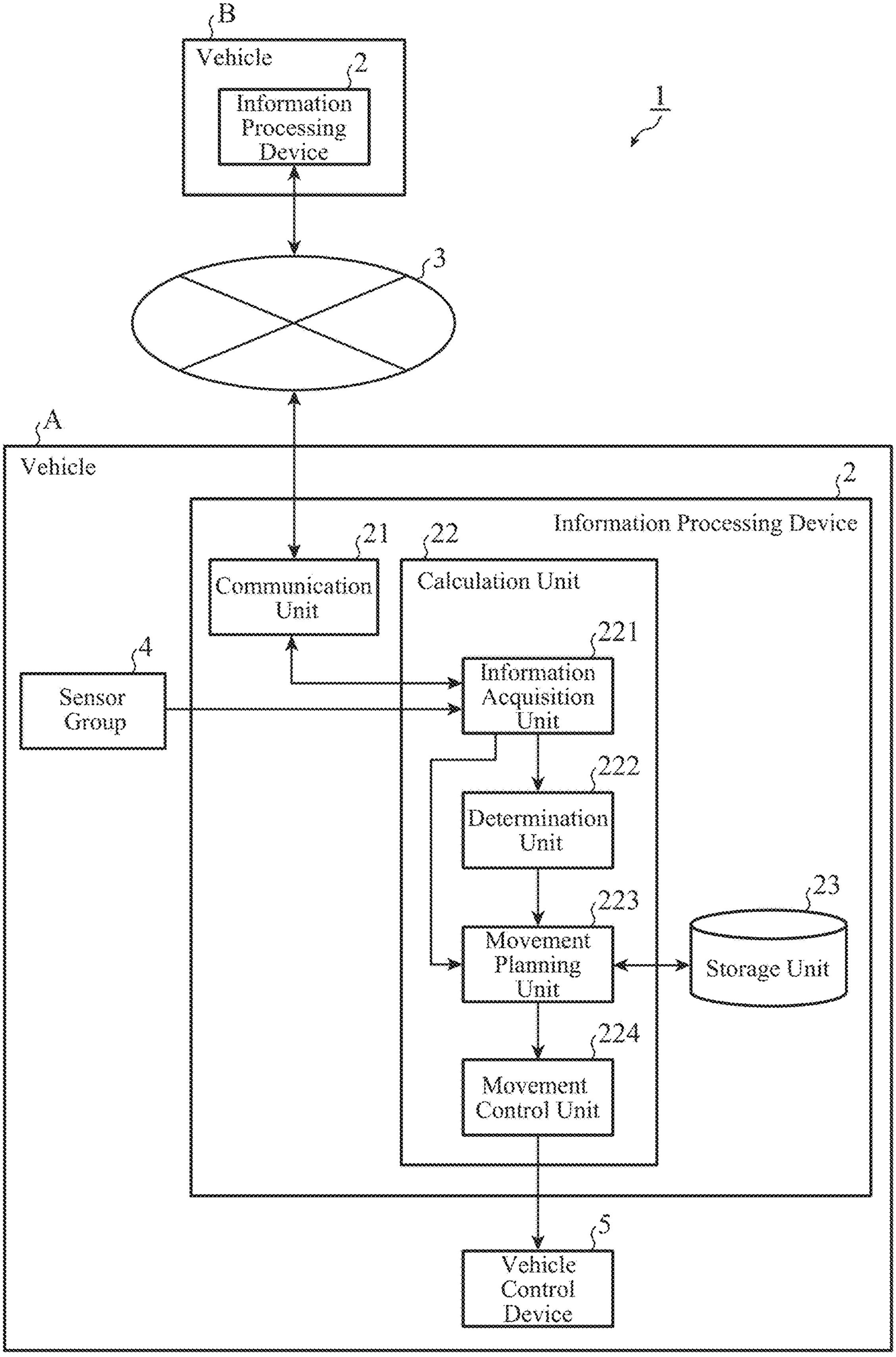
FIG. 1 is a block diagram illustrating a configuration example of a mobile body control system according to a first embodiment.

FIG. 1 is a block diagram illustrating a configuration example of a mobile body control system 1 according to a first embodiment. In FIG. 1, the mobile body control system 1 is a system in which an information processing device 2 mounted on a vehicle A and an information processing device 2 mounted on a vehicle B are connected via a network 3.

The network 3 is an electric communication line including the Internet.

The mobile body control system 1 provides a mobile body control service that couples the vehicle A and the vehicle B at a position where communication target occupants can easily communicate with each other on the basis of mobile body position information and occupant detection information.

The coupling between the vehicle A and the vehicle B in the mobile body control service includes, in addition to a physical coupling between the vehicle A and the vehicle B, an apparent coupling caused by parallel traveling of the vehicle A and the vehicle B.

The position where the occupants can easily communicate with each other includes, in addition to a position where the occupants face each other directly between the vehicle A and the vehicle B, a position where the occupants face each other obliquely while deviating from the position where the occupants face each other directly within a range not interfering with communication.

The information processing device 2, a sensor group 4, and a vehicle control device 5 are mounted on the vehicle A. In FIG. 1, only the information processing device 2 is illustrated in the vehicle B, but the sensor group 4 and the vehicle control device 5 are mounted on the vehicle B as on the vehicle A. The sensor group 4 includes various sensors that detect states inside and outside the vehicle. For example, the sensor group 4 includes an out-of-vehicle camera that images the outside of the vehicle, an in-vehicle camera that images the inside of the vehicle, a positioning sensor that measures position information (mobile body position information) of the vehicle, and a distance sensor that measures a distance to an object outside the vehicle.

The vehicle control device 5 mounted on the vehicle A controls traveling of the vehicle A. The vehicle control device 5 mounted on the vehicle B controls traveling of the vehicle B. The vehicle control device 5 controls traveling of the vehicle in accordance with driving operation information based on a driving operation of an occupant. In addition, the vehicle control device 5 controls traveling of the vehicle in accordance with mobile body control information input from external equipment. The mobile body control information includes, for example, route information indicating a route on which the vehicle is scheduled to travel, and designated vehicle speed information for designating a speed of the vehicle moving on the route. The vehicle A and the vehicle B may be vehicles that do not receive a driving operation of an occupant and autonomously travel only in accordance with mobile body control information input from external equipment.

As illustrated in FIG. 1, the information processing device 2 includes a communication unit 21, a calculation unit 22, and a storage unit 23. The communication unit 21 communicates with the information processing device 2 mounted on a vehicle to be coupled via the network 3. For example, the communication unit 21 can communicate with the information processing device 2 capable of mobile communication by a communication system such as LTE, 3G, 4G, or 5G via the network 3.

The calculation unit 22 controls the overall operation of the information processing device 2. The calculation unit 22 implements various functions by executing an information processing application for coupling the vehicle A and the vehicle B at a position where communication target occupants can easily communicate with each other in the mobile body control service. The storage unit 23 stores the information processing application and information used for calculation processing performed by the calculation unit 22. For example, the storage unit 23 stores movement plan information for coupling the vehicle A and the vehicle B, and determination information of a communication target occupant.

The calculation unit 22 includes an information acquisition unit 221, a determination unit 222, a movement planning unit 223, and a movement control unit 224. By the calculation unit 22 executing the information processing application, functions of the information acquisition unit 221, the determination unit 222, the movement planning unit 223, and the movement control unit 224 are implemented.

Figure 2:
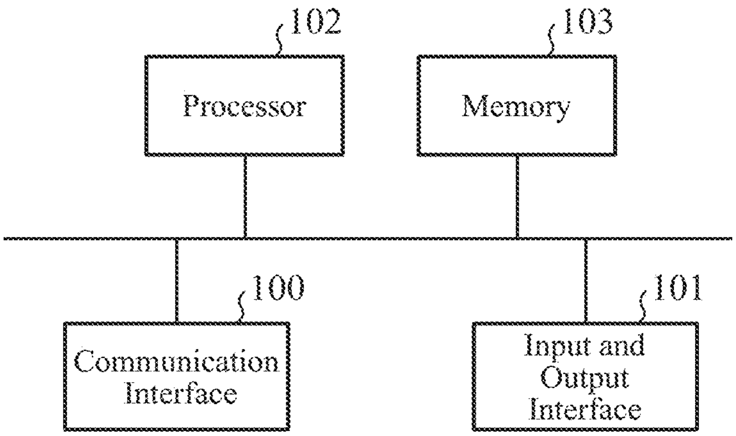
FIG. 2 is a block diagram illustrating a hardware configuration for implementing a function of an information processing device according to the first embodiment.

FIG. 2 is a block diagram illustrating a hardware configuration for implementing a function of the information processing device 2. For example, the information processing device 2 includes a communication interface 100, an input and output interface 101, a processor 102, and a memory 103 as a hardware configuration. The functions of the information acquisition unit 221, the determination unit 222, the movement planning unit 223, and the movement control unit 224 included in the information processing device 2 are implemented by these components of the hardware configuration.

The communication interface 100 outputs data received from an external device via the network 3 to the processor 102, and transmits data generated by the processor 102 to the information processing device 2 mounted on a vehicle to be coupled via the network 3. The processor 102 reads and writes data from and to the storage unit 23 via the input and output interface 101. The storage unit 23 is implemented by a storage device accessible by a computer that functions as the information processing device 2. Note that, although the information processing device 2 including the storage unit 23 is illustrated in FIG. 1, the storage unit 23 only needs to be a storage device accessible by a computer that functions as the information processing device 2, and may be present outside the information processing device 2.

The information acquisition unit 221 acquires mobile body position information of the vehicle A and the vehicle B and occupant detection information. For example, the information acquisition unit 221 acquires mobile body position information indicating the position of the vehicle A from the sensor group 4, and further acquires mobile body position information indicating the position of the vehicle B via the network 3 using the communication unit 21. In addition, the information acquisition unit 221 transmits the mobile body position information indicating the position of the vehicle A to the information processing device 2 mounted on the vehicle B via the network 3 using the communication unit 21. For example, at a point of time when communication target occupants are specified between the vehicle A and the vehicle B, the information acquisition unit 221 may acquire the mobile body position information in a cycle shorter than a cycle before this point of time. As a result, the information processing device 2 can accurately recognize the positions of the vehicles to be coupled.

The occupant detection information is detection information of occupants of the vehicle A and the vehicle B. For example, the occupant detection information includes, in addition to imaged video data of an occupant of the vehicle B imaged at a constant imaging rate by an out-of-vehicle camera, imaged video data of an occupant of the vehicle A imaged at a constant imaging rate by an in-vehicle camera. In addition, at a point of time when a communication target occupant is specified in each of the vehicle A and the vehicle B, the information acquisition unit 221 may acquire the occupant detection information in a cycle shorter than a cycle before this point of time, or may acquire the occupant detection information in synchronization with acquisition of the mobile body position information. As a result, the information processing device 2 can accurately recognize a state of the communication target occupant.

The determination unit 222 determines a communication target occupant on the basis of the occupant detection information. For example, the determination unit 222 detects a position and a face direction or a gesture of the occupant by analyzing images constituting captured video data of the occupant. As an image analysis method, an existing analysis method such as head pose estimation may be used. In a case where the position and the face direction of the occupant satisfy determination conditions, the determination unit 222 determines that the occupants are communication targets. For example, in a case where the positions of the occupants are in the vicinity of a coupling portion of vehicles and the faces of the occupants face each other between the vehicles, the determination unit 222 determines that these occupants are communication targets.

In addition, in a case where the gestures performed by the occupants between the vehicles request communication, the determination unit 222 determines that these occupants are communication target occupants. The gesture for requesting communication includes, for example, an action of pointing at the other party, raising a hand toward the other party, or shaking a hand.

In addition, the vehicle A and the vehicle B may include microphones, and the information acquisition unit 221 may acquire voice information of the occupants collected by the microphones. In a case where the determination unit 222 performs voice recognition on the voice information of the occupants acquired by the information acquisition unit 221 and determines that the occupant of the vehicle to be coupled is speaking to another occupant of the vehicle to be coupled, the determination unit 222 determines that the occupant who did speak to another occupant is a communication target.

Furthermore, the determination unit 222 may determine a communication target occupant using a learning model. For example, when receiving, as an input, captured video data of an occupant, the determination unit 222 determines a communication target occupant using a learning model that outputs information indicating whether or not the occupant is the communication target. As a result, the determination unit 222 can accurately determine a communication target occupant.

The movement planning unit 223 prepares a movement plan in which the vehicle A and the vehicle B are coupled at a position where communication target occupants can easily communicate with each other. For example, the movement planning unit 223 estimates traveling states of the vehicle A and the vehicle B on the basis of temporal changes in the positions of the vehicle A and the vehicle B indicated by mobile body position information of each of the vehicle A and the vehicle B. Then, the movement planning unit 223 estimates a route from the current traveling positions of the vehicle A and the vehicle B to a position where the vehicle A and the vehicle B are coupled at a position where communication target occupants can easily communicate with each other (for example, at a position where the occupants face each other). At this time, the movement planning unit 223 designates vehicle speeds of the vehicle A and the vehicle B on the estimated route depending on the traveling states of the vehicle A and the vehicle B.

Information including route information indicating the route where the vehicle A and the vehicle B are coupled and designation information of the vehicle speeds is included in the movement plan information. The movement planning unit 223 outputs the movement plan information to the movement control unit 224 and causes the storage unit 23 to store the movement plan information.

For example, the information processing device 2 mounted on the vehicle A calculates, in addition to the movement plan information of the vehicle A, the movement plan information of the vehicle B. Conversely, the information processing device 2 mounted on the vehicle B may calculate, in addition to the movement plan information of the vehicle B, the movement plan information of the vehicle A. In addition, the information processing device 2 mounted on the vehicle A may calculate only the movement plan information of the vehicle A, and the information processing device 2 mounted on the vehicle B may calculate only the movement plan information of the vehicle B.

The movement control unit 224 couples the vehicle A and the vehicle B by outputting mobile body control information for moving the vehicle A and the vehicle B in accordance with the movement plan to the vehicle A and the vehicle B. For example, the movement control unit 224 generates mobile body control information for causing the vehicle A and the vehicle B to travel in accordance with the movement plan information. The movement control unit 224 mounted on the vehicle A transmits the generated mobile body control information to the information processing device 2 mounted on the vehicle B via the network 3 using the communication unit 21. The movement control unit 224 outputs mobile body control information for the vehicle A to the vehicle control device 5 mounted on the vehicle A. By the vehicle control device 5 controlling traveling in accordance with the mobile body control information, the vehicle A and the vehicle B are coupled.

Figure 3:
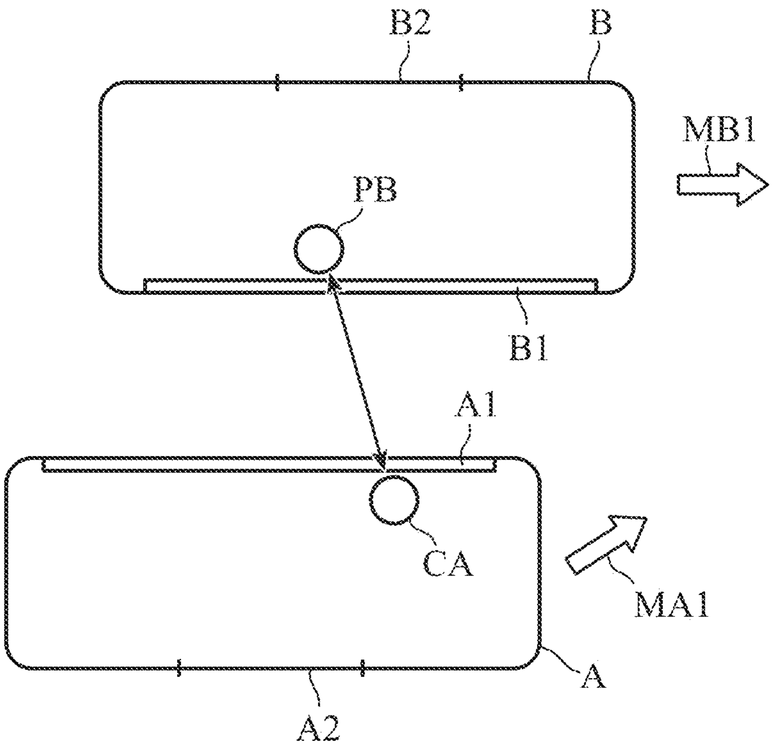
FIG. 3 is an explanatory diagram illustrating an outline of vehicles to be coupled.

FIG. 3 is an explanatory diagram illustrating an outline of the vehicle A and the vehicle B to be coupled, and illustrates an arrangement of occupants in the vehicles. It is assumed that the vehicle A includes a coupling portion A1 and an entrance A2 and is traveling in a direction of an arrow MA1. The vehicle B includes a coupling portion B1 and an entrance B2 and is traveling in a direction of an arrow MB1. The coupling portion A1 and the coupling portion B1 are portions where the vehicle A and the vehicle B are coupled. Each of the coupling portion A1 and the coupling portion B1 may have a physically coupling mechanism, or may be a simple side surface without a special coupling mechanism.

Note that each of the coupling portion A1 and the coupling portion B1 is an open portion without a wall or the like that prevents direct communication between occupants. In addition, a seat such as a bench may be disposed in the vicinity of the coupling portion A1 and the coupling portion B1 in such a manner that occupants can easily communicate with each other between the vehicle A and the vehicle B.

The entrance A2 is a portion where an occupant gets on or off the vehicle A, and the entrance B2 is a portion where an occupant gets on or off the vehicle B. In addition, in a case where an occupant transfers between the vehicle A and the vehicle B, the portions where the entrance A2 and the entrance B2 are formed in the vehicle A and the vehicle B may be used as the coupling portion A1 and the coupling portion B1, respectively.

As indicated by a double-headed arrow in FIG. 3, it is assumed that an occupant CA of the vehicle A and an occupant PB of the vehicle B are communication target occupants. The determination unit 222 determines that the occupant CA and the occupant PB are communication target occupants on the basis of occupant detection information. The movement planning unit 223 prepares a movement plan for coupling the vehicle A and the vehicle B at a position where the occupant CA and the occupant PB can easily communicate with each other. For example, the movement plan is prepared in such a manner that the occupant CA and the occupant PB face each other.

Figure 4:
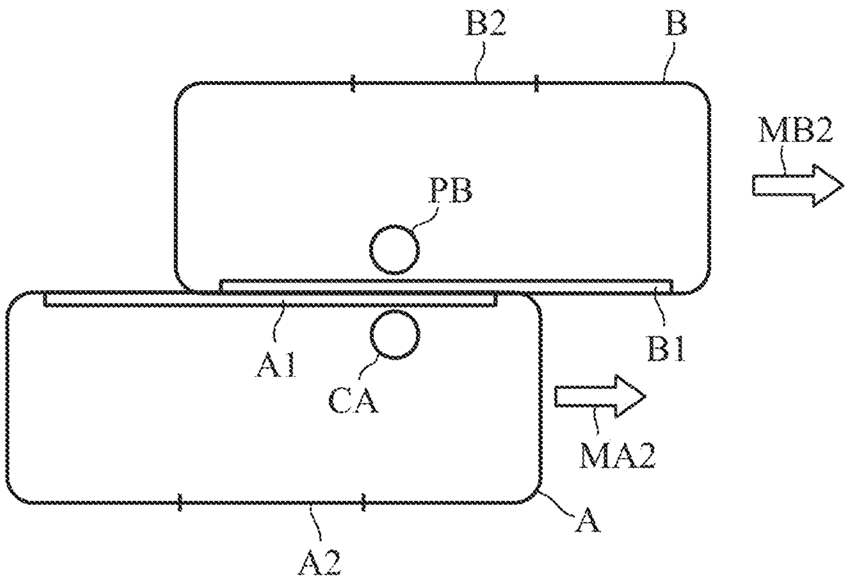
FIG. 4 is an explanatory diagram illustrating internal situations of coupled vehicles in the first embodiment.

FIG. 4 is an explanatory diagram illustrating internal situations of coupled vehicles in the first embodiment, and illustrates a state when the vehicle A and the vehicle B are coupled subsequently to the state of FIG. 3. The movement control unit 224 generates mobile body control information for moving the vehicle A and the vehicle B in accordance with the movement plan for coupling the vehicle A and the vehicle B at a position where the occupant CA and the occupant PB face each other. Then, the movement control unit 224 outputs the mobile body control information to the vehicle control devices 5 included in the vehicle A and the vehicle B. The vehicle control device 5 causes the vehicle A to travel in the direction of the arrow MA2 and causes the vehicle B to travel in the direction of the arrow MB2 in accordance with the mobile body control information. As a result, the vehicle A and the vehicle B travel in parallel. At this time, the coupling portion A1 and the coupling portion B1 may be physically coupled, or an apparently coupled state may be obtained by causing the vehicle A and the vehicle B to travel in parallel.

As illustrated in FIG. 4, the vehicle A and the vehicle B are coupled at a position where the occupant CA and the occupant PB face each other, and therefore the occupant CA and the occupant PB can directly communicate with each other.

In addition, the movement control unit 224 may control traveling of the vehicle A and the vehicle B depending on a communication situation between the occupant CA and the occupant PB even after the vehicle A and the vehicle B are coupled.

For example, in a case where a meal service is provided from the occupant CA to the occupant PB, the information acquisition unit 221 sequentially acquires occupant detection information indicating an exchange state between the occupant CA and the occupant PB. The determination unit 222 sequentially determines the exchange state between the occupant CA and the occupant PB on the basis of the occupant detection information. In a case where the determination unit 222 determines that there is a situation in which it is desired to reduce vibration, such as delivery of a beverage from the occupant CA to the occupant PB, the movement planning unit 223 prepares a movement plan for gradually decelerating the vehicle A and the vehicle B traveling in parallel. The vehicle control device 5 controls traveling of the vehicle A and the vehicle B in accordance with the mobile body control information based on the prepared movement plan, and as a result, the vehicle A and the vehicle B are gradually decelerated in a case where the occupant CA and the occupant PB desire to reduce vibration.

In addition, in a case where a meal service is provided from the occupant CA to the occupant PB, the position where the occupant CA and the occupant PB can easily communicate with each other may be a position where the occupant CA can easily handle a cooking appliance and a utensil in such a manner that the occupant CA can easily provide a dish to the occupant PB.

Figure 5:
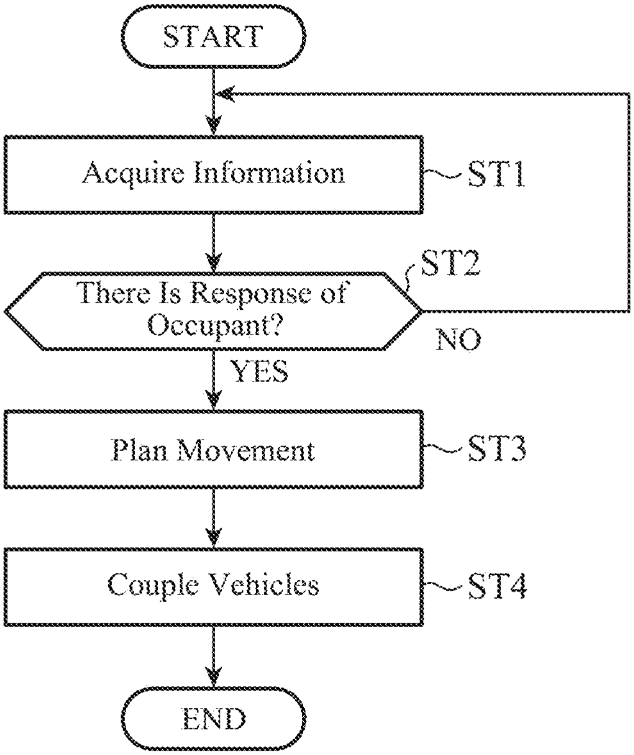
FIG. 5 is a flowchart illustrating an information processing method according to the first embodiment.

FIG. 5 is a flowchart illustrating an information processing method according to the first embodiment.

The information acquisition unit 221 acquires mobile body position information of the vehicle A and the vehicle B and occupant detection information of states of occupants of the vehicle A and the vehicle B (step ST1).

The determination unit 222 determines whether or not there is an occupant who has responded to a communication request on the basis of the occupant detection information (step ST2). If there is no occupant who has responded here (step ST2; NO), the process returns to step ST1.

On the other hand, if there are occupants who have responded (step ST2; YES), the determination unit 222 determines that these occupants are communication targets. Here, it is assumed that the occupant CA and the occupant PB are determined to be communication targets.

The movement planning unit 223 prepares a movement plan of mobile bodies to be coupled at a position where the communication target occupants can easily communicate with each other (step ST3).

The movement control unit 224 couples the vehicle A and the vehicle B by outputting mobile body control information for moving the vehicle A and the vehicle B in accordance with the movement plan to the vehicle A and the vehicle B (step ST4).

As a result, the communication target occupants are located at positions where the communication target occupants can easily communicate with each other when the vehicle A and the vehicle B are coupled, and therefore the occupants can directly communicate with each other between the vehicle A and the vehicle B.

Figure 6:
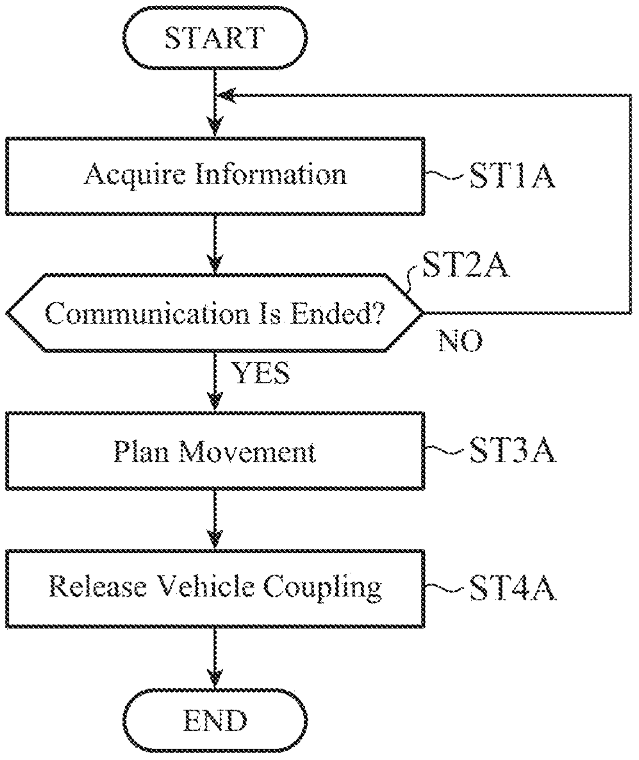
FIG. 6 is a flowchart illustrating vehicle coupling release processing in the first embodiment.

FIG. 6 is a flowchart illustrating vehicle coupling release processing in the first embodiment.

The information acquisition unit 221 acquires mobile body position information of the vehicle A and the vehicle B and occupant detection information of states of occupants of the vehicle A and the vehicle B (step ST1A).

The determination unit 222 determines whether or not the communication between the occupant CA and the occupant PB has ended on the basis of the occupant detection information (step ST2A). For example, in a case where an action that one of the occupant CA and the occupant PB moves away from the coupling position, turns its back to the other, or talks to another occupant is detected as the occupant detection information, the determination unit 222 determines that the communication has ended.

If the communication between the occupant CA and the occupant PB has not ended (step ST2A; NO), the process returns to step ST1A.

If it is determined that the communication has ended (step ST2A; YES), the determination unit 222 notifies the movement planning unit 223 of the fact.

When receiving the notification of the end of the communication, the movement planning unit 223 prepares a movement plan for releasing the coupling between the vehicle A and the vehicle B (step ST3A).

The movement control unit 224 generates mobile body control information for releasing the coupling in accordance with the movement plan, and outputs the generated mobile body control information to the vehicle control devices 5 of the vehicle A and the vehicle B. The vehicle control devices 5 control traveling of the vehicle A and the vehicle B in such a manner that the coupling between the vehicle A and the vehicle B is released on the basis of the mobile body control information (step ST4A).

As a result, the coupling between the vehicle A and the vehicle B can be released in response to the end of the communication.

Figure 7:
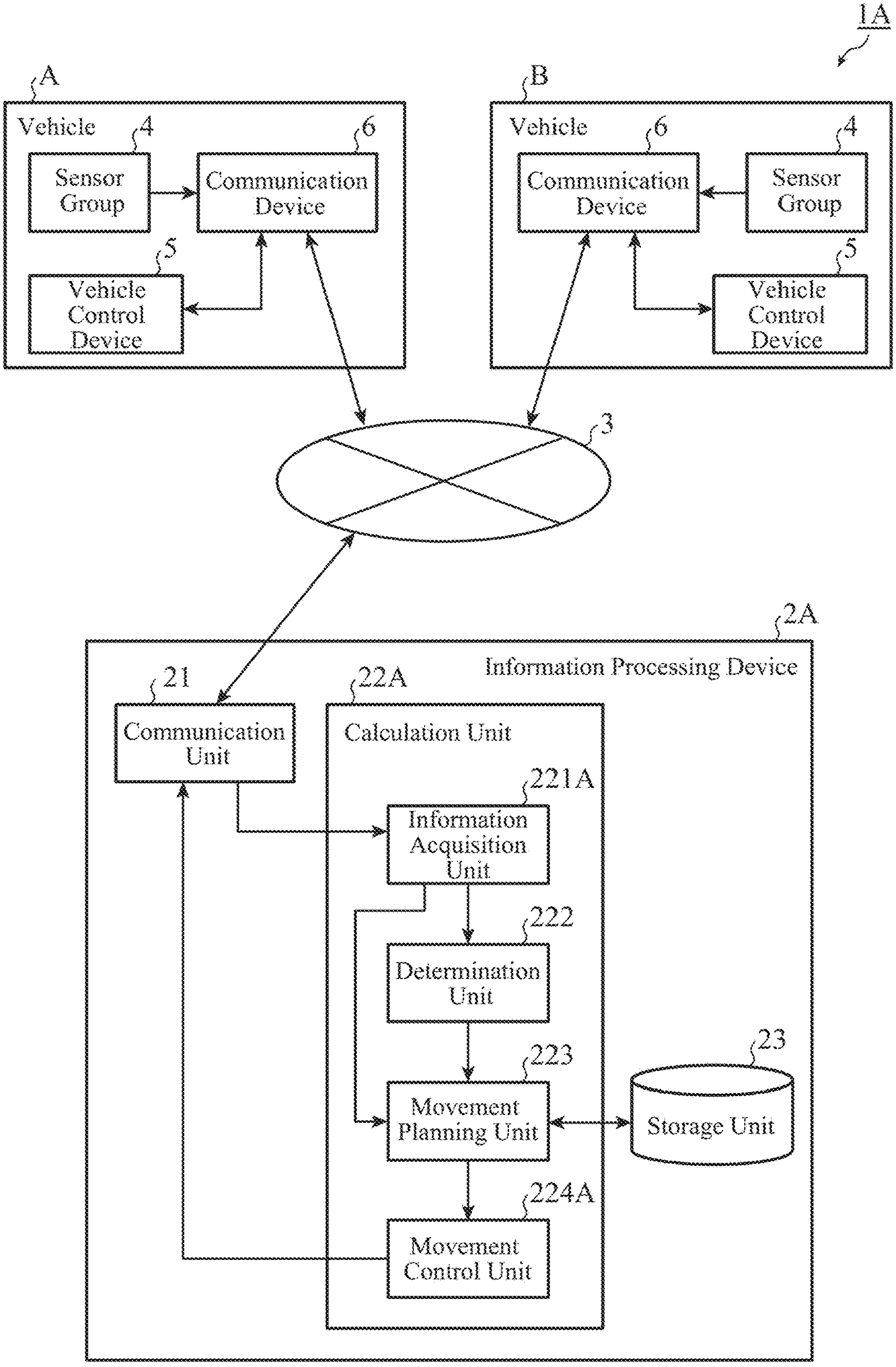
FIG. 7 is a block diagram illustrating a configuration of a modification of the mobile body control system according to the first embodiment.

FIG. 7 is a block diagram illustrating a configuration of a mobile body control system 1A which is a modification of the mobile body control system 1. In the mobile body control system 1, the information processing device 2 is disposed in each of the vehicle A and the vehicle B. However, in the mobile body control system 1A, an information processing device 2A functions as a server that controls traveling of the vehicle A and the vehicle B.

In the mobile body control system 1A, each of the vehicle A and the vehicle B does not include the information processing device 2, but includes only the sensor group 4, the vehicle control device 5, and the communication device 6. The information processing device 2A includes the communication unit 21, a calculation unit 22A, and the storage unit 23.

The calculation unit 22A includes an information acquisition unit 221A, the determination unit 222, the movement planning unit 223, and a movement control unit 224A. By the calculation unit 22A executing an information processing application, functions of the information acquisition unit 221A, the determination unit 222, the movement planning unit 223, and the movement control unit 224A are implemented.

The information acquisition unit 221A acquires mobile body position information and occupant detection information of the vehicle A and the vehicle B. For example, by the communication unit 21 and the communication device 6 communicating with each other via the network 3, the information acquisition unit 221A acquires mobile body position information indicating the positions of the vehicle A and the vehicle B and occupant detection information of the vehicle A and the vehicle B.

By the communication unit 21 and the communication device 6 communicating with each other via the network 3, the movement control unit 224A transmits mobile body control information for causing the vehicle A and the vehicle B to travel in accordance with the movement plan information to the vehicle control device 5 included in the vehicle A and to the vehicle control device 5 included in the vehicle B. By the vehicle control devices 5 mounted on the vehicle A and the vehicle B controlling traveling of the vehicle A and the vehicle B in accordance with the received mobile body control information, the vehicle A and the vehicle B are coupled. Even with such a configuration, the information processing device 2A can couple the vehicle A and the vehicle B at a position where communication target occupants can easily communicate with each other.

Although the configuration in which the vehicle A and the vehicle B are coupled has been described so far, the information processing device 2 is not limited thereto. For example, the information processing device 2 may couple three or more vehicles depending on the shapes of the vehicles and the number of surfaces that can be coupled. As a result, the information processing device 2 can couple three or more vehicles at a position where communication target occupants can easily communicate with each other.

As described above, the information processing device 2 according to the first embodiment includes: the information acquisition unit 221 that acquires mobile body position information and occupant detection information; the determination unit 222 that determines a communication target occupant on the basis of the occupant detection information; the movement planning unit 223 that prepares a movement plan in which the vehicle A and the vehicle B are coupled at a position where the communication target occupants can easily communicate with each other; and the movement control unit 224 that couples the vehicle A and the vehicle B by outputting mobile body control information for moving the vehicle A and the vehicle B in accordance with the movement plan to the vehicle A and the vehicle B.

The communication target occupants are located at positions where the communication target occupants can easily communicate with each other when the vehicle A and the vehicle B are coupled, and therefore in the information processing device 2, the occupants can directly communicate with each other between the vehicle A and the vehicle B.

In the information processing device 2 according to the first embodiment, the movement planning unit 223 prepares a movement plan in which the vehicle A and the vehicle B are coupled at a position where communication target occupants face each other.

The communication target occupants face each other when the vehicle A and the vehicle B are coupled, and therefore in the information processing device 2, the occupants can directly communicate with each other between the vehicle A and the vehicle B.

In the information processing device 2 according to the first embodiment, the information acquisition unit 221 acquires detection information of at least one of positions of occupants, face directions of the occupants, and gestures performed by the occupants in the vehicle A and the vehicle B. The determination unit 222 determines a communication target occupant on the basis of at least one of positions of the occupants, face direction of the occupants, and gestures performed by the occupants in the vehicle A and the vehicle B. As a result, the determination unit 222 can accurately determine a communication target occupant.

The mobile body control system 1 according to the first embodiment includes the vehicle A and the vehicle B that move on the basis of mobile body control information, and the information processing device 2. It is possible to provide the mobile body control system 1 in which occupants can directly communicate with each other when the vehicle A and the vehicle B are coupled.

An information processing method according to the first embodiment includes: acquiring, by the information acquisition unit 221, mobile body position information of a mobile body and occupant detection information of a state of an occupant in the mobile body; determining, by the determination unit 222, a communication target occupant on the basis of the occupant detection information; preparing, by the movement planning unit 223, a movement plan of mobile bodies to be coupled at a position where the communication target occupants can easily communicate with each other; and coupling, by the movement control unit 224, the mobile bodies by outputting mobile body control information for moving the mobile bodies in accordance with the movement plan to the mobile bodies. The communication target occupants are located at positions where the communication target occupants can easily communicate with each other when the vehicle A and the vehicle B are coupled, and therefore the occupants can directly communicate with each other between the vehicle A and the vehicle B.

Second Embodiment

Figure 8:
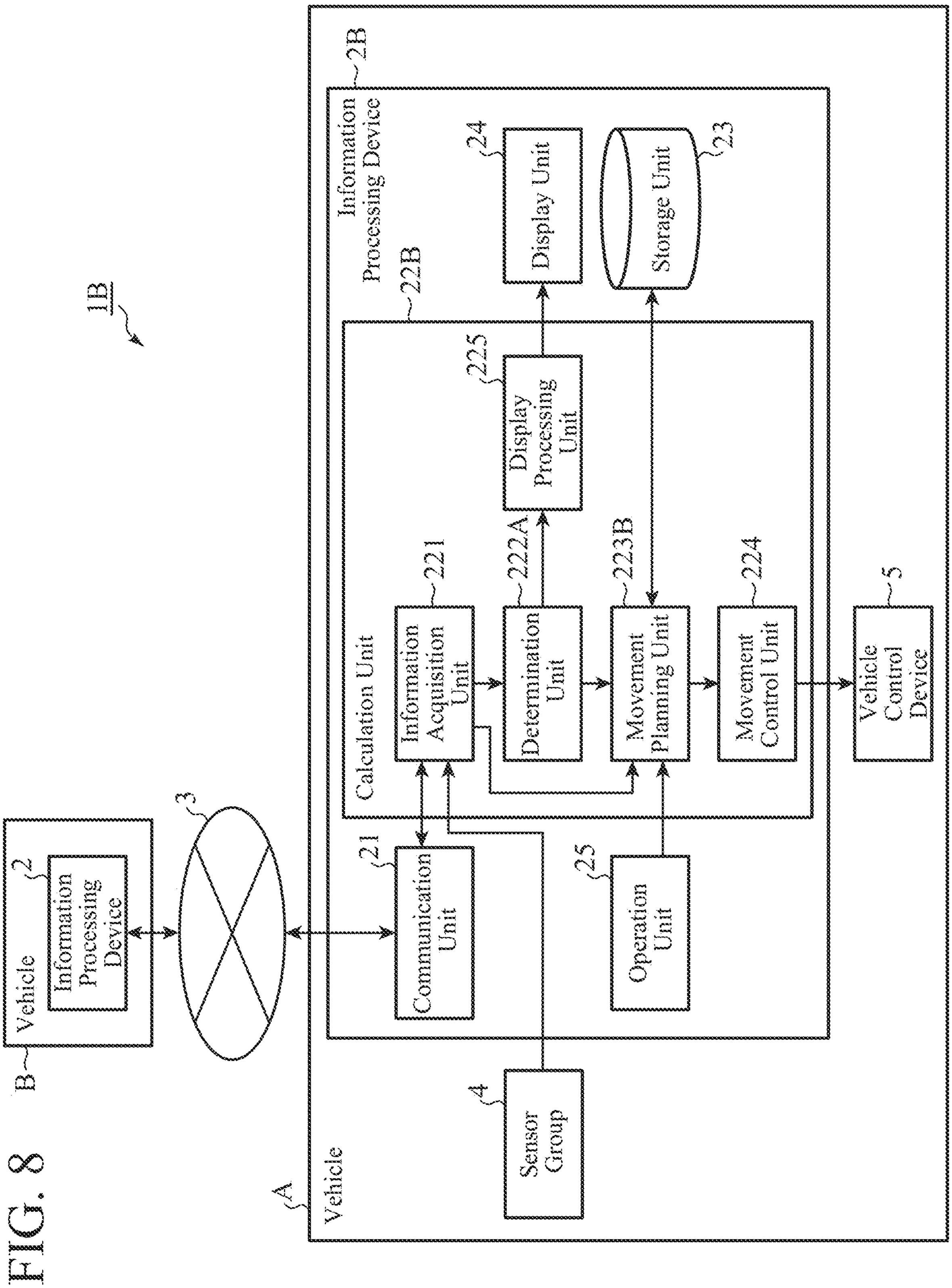
FIG. 8 is a block diagram illustrating a configuration example of a mobile body control system according to a second embodiment.

FIG. 8 is a block diagram illustrating a configuration example of a mobile body control system 1B according to a second embodiment. In FIG. 8, the mobile body control system 1B is a system in which an information processing device 2B mounted on a vehicle A and an information processing device 2 mounted on a vehicle B are connected via a network 3.

The information processing device 2B includes a communication unit 21, a calculation unit 22B, a storage unit 23, a display unit 24, and an operation unit 25.

The calculation unit 22B controls the overall operation of the information processing device 2B. The calculation unit 22B implements various functions by executing an information processing application for coupling the vehicle A and the vehicle B at a position where communication target occupants can easily communicate with each other in a mobile body control service.

The display unit 24 is a display device included in the information processing device 2B. For example, the display unit 24 is a liquid crystal display (LCD) or an organic electroluminescence (EL) display device.

The operation unit 25 is an input device that receives an operation on a selection screen or the like displayed on the display unit 24. In a case where the information processing device 2B is a smartphone or a tablet terminal, the operation unit 25 is, for example, a touch panel disposed integrally with a screen of the display unit 24. In a case where the information processing device 2B is a PC, the operation unit 25 is, for example, a mouse or a keyboard.

The calculation unit 22B includes an information acquisition unit 221, a determination unit 222A, a movement planning unit 223B, a movement control unit 224, and a display processing unit 225. By the calculation unit 22B executing the information processing application, functions of the information acquisition unit 221, the determination unit 222A, the movement planning unit 223B, the movement control unit 224, and the display processing unit 225 are implemented.

Figure 9:
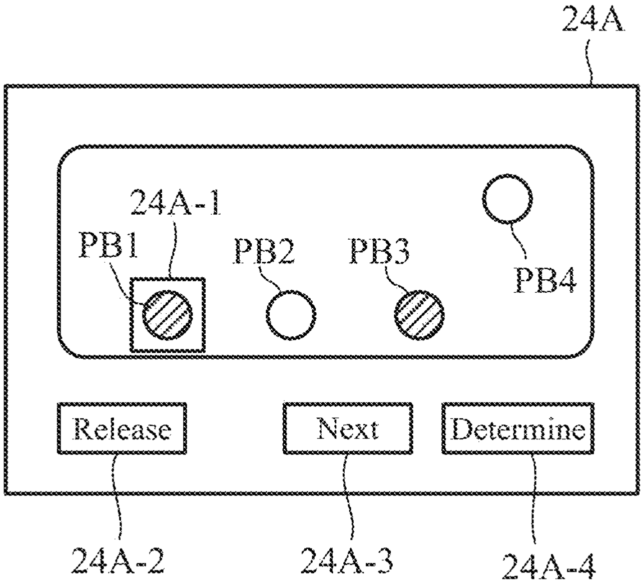
FIG. 9 is a screen view illustrating a selection screen in the second embodiment.

The display processing unit 225 outputs display control information for displaying a selection screen for selecting a communication target occupant to the display unit 24. FIG. 9 is a screen view illustrating a selection screen 24A in the second embodiment. In FIG. 9, an occupant arrangement in the vehicle B is displayed on the selection screen 24A. The display processing unit 225 generates display control information for displaying the selection screen 24A reflecting a state of an occupant of the vehicle B determined by the determination unit 222A.

For example, among occupants PB1, PB2, PB3, and PB4 of the vehicle B, the occupants PB1, PB2, and PB3 are present in the vicinity of a coupling portion. Therefore, each of images indicating the occupants PB1, PB2, and PB3 has a display mode different from that of the occupant PB4 not in the vicinity of the coupling portion.

It is assumed that faces of the occupants PB1 and PB3 face the vehicle A side from the coupling portion. At this time, the occupants PB1 and PB3 can be communication target occupants with an occupant of the vehicle A. Therefore, the display forms of the images indicating the occupants PB1 and PB3 are changed in such a manner as to be distinguished from images of the other occupants. For example, colors of the images indicating the occupants PB1 and PB3 are made different from colors of images of the other occupants.

By a button image 24A-3 described as "next" on the selection screen 24A being sequentially pressed using the operation unit 25, a surrounding image 24A-1 is moved to a position surrounding each of the occupants PB1, PB2, PB3, and PB4. In the example illustrated in FIG. 9, the surrounding image 24A-1 is at a position surrounding the image of the occupant PB1. By a button image 24A-4 described as "enter" being pressed using the operation unit 25 with the surrounding image 24A-1 surrounding an image of an occupant, the occupant surrounded by the surrounding image 24A-1 is determined to be a communication target with an occupant of the vehicle A. In addition, by a button image 24A-2 described as "release" being pressed using the operation unit 25, coupling between the vehicle A and the vehicle B is released.

In this manner, the display processing unit 225 generates display control information for displaying a selection screen corresponding to a state of an occupant determined by the determination unit 222A. The determination unit 222A determines that an occupant selected using the selection screen displayed on the display unit 24 is a communication target occupant.

The movement planning unit 223B prepares a movement plan in which the vehicle A and the vehicle B are coupled at a position where communication target occupants can easily communicate with each other.

For example, when it is determined that a communication target occupant with the occupant CA of the vehicle A is the occupant PB1 of the vehicle B using the selection screen 24A, the movement planning unit 223B prepares a movement plan in which the vehicle A and the vehicle B are coupled at a position where the occupant CA and the occupant PB1 can easily communicate with each other.

Figure 10:
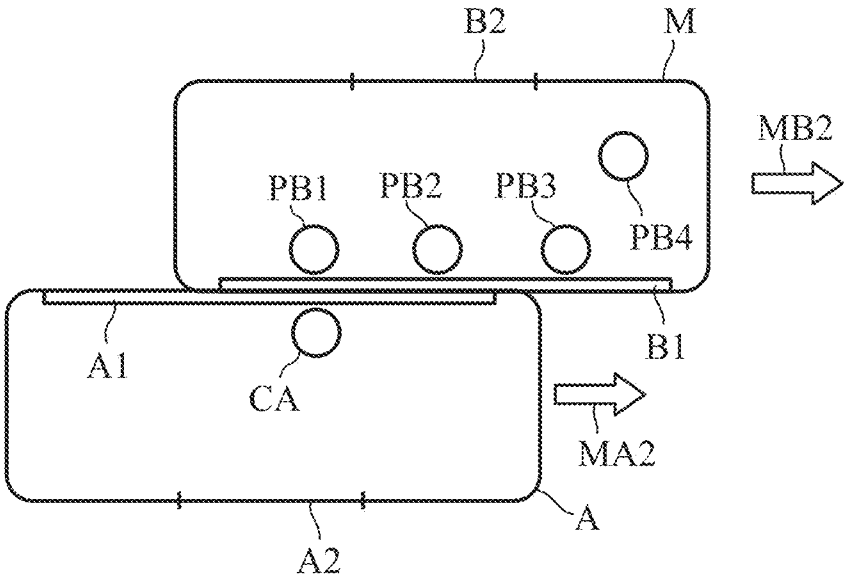
FIG. 10 is an explanatory diagram illustrating an outline of coupled vehicles in the second embodiment.

The movement control unit 224 couples the vehicle A and the vehicle B by outputting mobile body control information for moving the vehicle A and the vehicle B to the vehicle A and the vehicle B in accordance with the movement plan prepared by the movement planning unit 223B. FIG. 10 is an explanatory diagram illustrating an outline of the coupled vehicle A and vehicle B in the second embodiment. For example, as illustrated in FIG. 10, the vehicle A and the vehicle B are coupled at a position where the occupant CA and the occupant PB1 face each other, and therefore the occupant CA and the occupant PB1 can directly communicate with each other.

Figure 11:
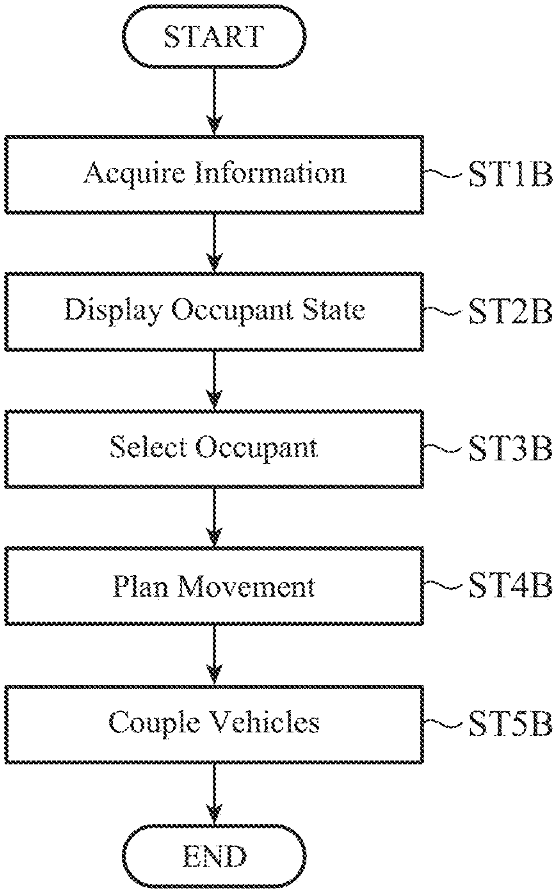
FIG. 11 is a flowchart illustrating an information processing method according to the second embodiment.

FIG. 11 is a flowchart illustrating an information processing method according to the second embodiment.

The information acquisition unit 221 acquires mobile body position information of the vehicle A and the vehicle B and occupant detection information of states of occupants of the vehicle A and the vehicle B (step ST1B).

The determination unit 222A determines the states of the occupants of the vehicle A and the vehicle B on the basis of the occupant detection information (step ST2B).

The display processing unit 225 causes the display unit 24 to display the selection screen 24A on the basis of the state of the occupant of the vehicle B. The occupant of the vehicle A selects an occupant from the selection screen 24A using the operation unit 25 (step ST3B). The determination unit 222A determines that the occupant selected from the selection screen 24A is a communication target. Here, it is assumed that the occupant PB1 is determined to be a communication target with the occupant CA.

The movement planning unit 223B prepares a movement plan of mobile bodies to be coupled at a position where the communication target occupants can easily communicate with each other (step ST4B).

The movement control unit 224 couples the vehicle A and the vehicle B by outputting mobile body control information for moving the vehicle A and the vehicle B in accordance with the movement plan to the vehicle A and the vehicle B (step ST5B). As a result, the communication target occupants are located at positions where the communication target occupants can easily communicate with each other when the vehicle A and the vehicle B are coupled, and therefore the occupants can directly communicate with each other between the vehicle A and the vehicle B.

Figure 12:
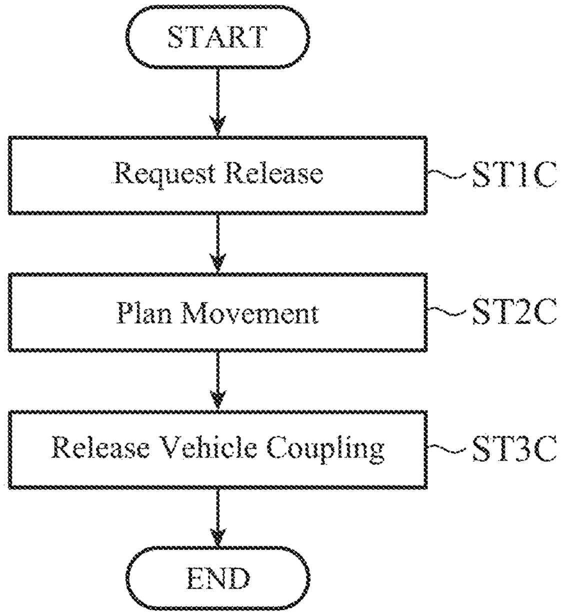
FIG. 12 is a flowchart illustrating vehicle coupling release processing in the second embodiment.

FIG. 12 is a flowchart illustrating vehicle coupling release processing in the second embodiment.

The display processing unit 225 causes the display unit 24 to display the selection screen 24A.

By pressing the button image 24A-2 described as "release" on the selection screen 24A using the operation unit 25, an occupant of the vehicle A requests releasing the coupling between the vehicle A and the vehicle B (step ST1C).

When receiving the request for releasing the coupling between the vehicle A and the vehicle B, the movement planning unit 223B prepares a movement plan for releasing the coupling between the vehicle A and the vehicle B (step ST2C).

The movement control unit 224 generates mobile body control information for releasing the coupling in accordance with the movement plan, and outputs the generated mobile body control information to the vehicle control devices 5 of the vehicle A and the vehicle B. The vehicle control devices 5 control traveling of the vehicle A and the vehicle B in such a manner that the coupling between the vehicle A and the vehicle B is released on the basis of the mobile body control information (step ST3C).

As a result, the coupling between the vehicle A and the vehicle B can be released in response to the coupling release request.

The information processing device 2B according to the second embodiment includes the display processing unit 225 that outputs display control information for displaying the selection screen 24A for selecting a communication target occupant to the display unit 24 The determination unit 222A determines that an occupant selected using the selection screen 24A displayed on the display unit 24 is a communication target occupant. As a result, the information processing device 2B can select the communication target occupant using the selection screen 24A. In addition, the communication target occupants are located at positions where the communication target occupants can easily communicate with each other when the vehicle A and the vehicle B are coupled, and therefore in the information processing device 2B, the occupants can directly communicate with each other between the vehicle A and the vehicle B.

Third Embodiment

Figure 13:
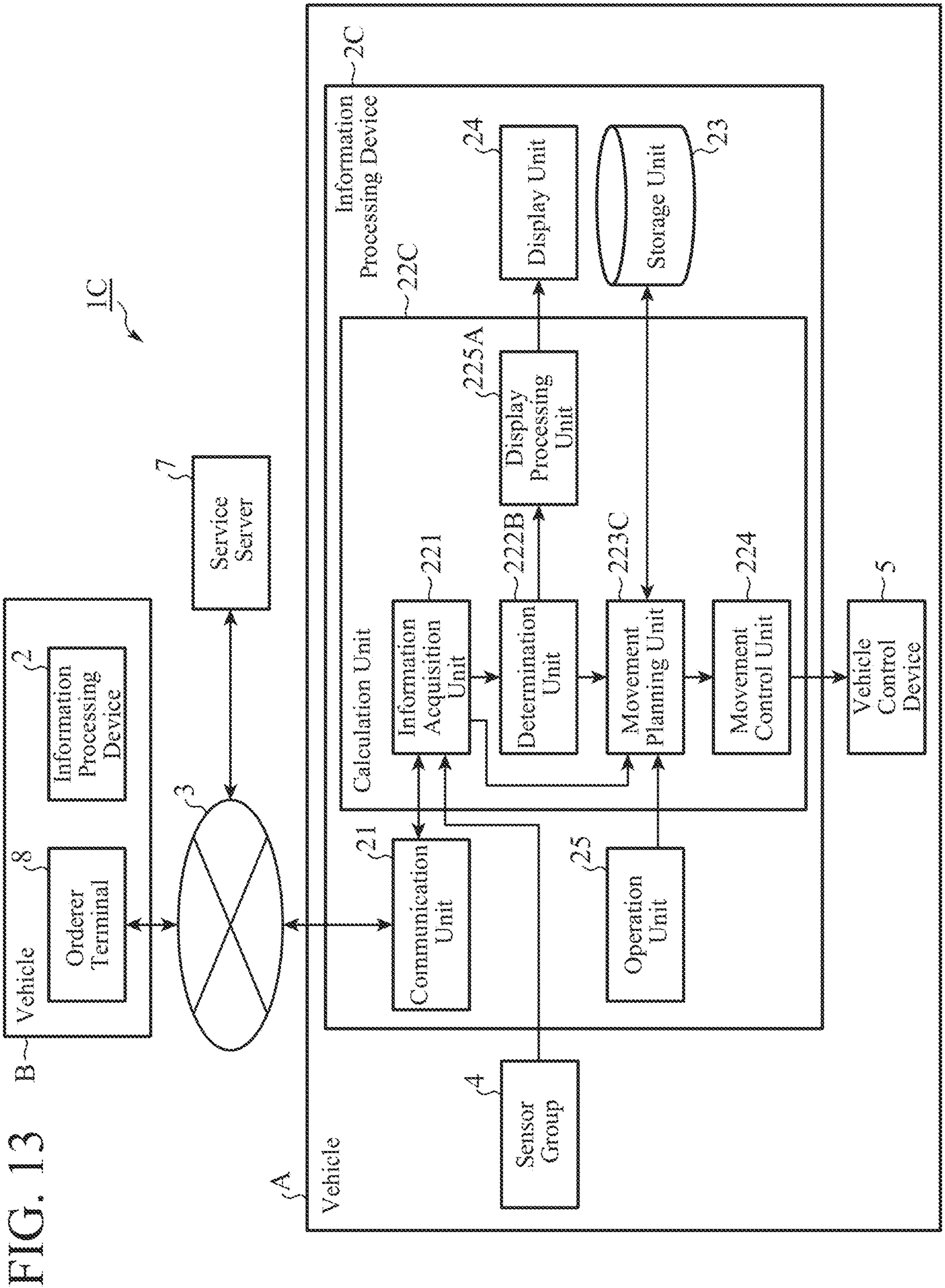
FIG. 13 is a block diagram illustrating a configuration example of a mobile body control system according to a third embodiment.

FIG. 13 is a block diagram illustrating a configuration example of a mobile body control system 1C according to a third embodiment. In FIG. 13, the mobile body control system 1C is a system in which an information processing device 2C mounted on a vehicle A, an information processing device 2 mounted on a vehicle B, and a service server 7 are connected via a network 3. In addition, in the vehicle B, for example, there is an occupant having an orderer terminal 8 for accessing the service server 7 that provides a selling service. The information processing device 2C includes a communication unit 21, a calculation unit 22C, a storage unit 23, a display unit 24, and an operation unit 25.

The calculation unit 22C controls the overall operation of the information processing device 2C. The calculation unit 22C implements various functions by executing an information processing application for coupling the vehicle A and the vehicle B at a position where communication target occupants can easily communicate with each other in a mobile body control service.

The calculation unit 22C includes an information acquisition unit 221, a determination unit 222B, a movement planning unit 223C, a movement control unit 224, and a display processing unit 225A. By the calculation unit 22C executing the information processing application, functions of the information acquisition unit 221, the determination unit 222B, the movement planning unit 223C, the movement control unit 224, and the display processing unit 225A are implemented.

Figure 14:
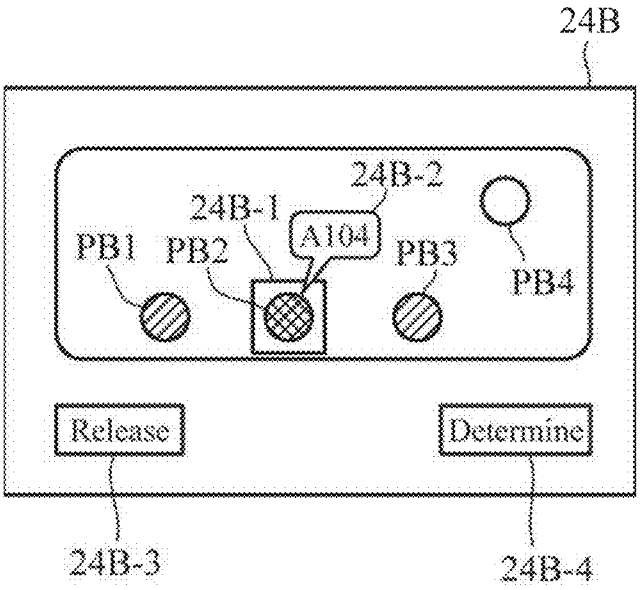
FIG. 14 is a screen view illustrating a selection screen in the third embodiment.

The display processing unit 225A outputs display control information for displaying the selection screen 24B describing an occupant who has requested a service as a selection target candidate together with service information to the display unit 24. FIG. 14 is a screen view illustrating the selection screen 24B in the third embodiment. In FIG. 14, an occupant arrangement in the vehicle B is displayed on the selection screen 24B. The display processing unit 225A generates display control information for displaying the selection screen 24B reflecting a state of an occupant of the vehicle B determined by the determination unit 222B.

For example, among occupants PB1, PB2, PB3, and PB4 of the vehicle B, the occupants PB1, PB2, and PB3 are present in the vicinity of a coupling portion. Therefore, each of images indicating the occupants PB1, PB2, and PB3 has a display mode different from that of the occupant PB4 not in the vicinity of the coupling portion.

In addition, the occupant PB2 is an occupant who receives provision of a service from the service server 7 using the orderer terminal 8. Therefore, an image 24B-2 of service information indicating an order number "A104" is described adjacent to the image indicating the occupant PB2. At this time, the occupant PB2 can be a communication target occupant with an occupant of the vehicle A. Therefore, the display form of the image indicating the occupant PB2 is changed in such a manner as to be distinguished from images indicating the occupants PB1 and PB3. For example, a color of the image indicating the occupant PB2 is made different from colors of the images indicating the occupants PB1 and PB3.

In the example illustrated in FIG. 14, a surrounding image 24B-1 is at a position surrounding the image of the occupant PB2. By a button image 24B-4 described as "enter" being pressed using the operation unit 25 with the surrounding image 24B-1 surrounding an image of an occupant, the occupant surrounded by the surrounding image 24B-1 is determined to be a communication target with an occupant of the vehicle A. In addition, by a button image 24B-3 described as "release" being pressed using the operation unit 25, the coupling between the vehicle A and the vehicle B is released.

The information acquisition unit 221 acquires service information (for example, order number "A104") regarding a specific service whose provision is requested by the occupant PB2 of the vehicle B to the service server 7 using the orderer terminal 8. The display processing unit 225A outputs display control information for causing the selection screen 24B to display the occupant PB2 who has requested a service as a selection target candidate together with service information to the display unit 24. The determination unit 222B determines that the occupant PB2 selected using the selection screen 24B displayed on the display unit 24 is a communication target occupant.

The movement planning unit 223C prepares a movement plan in which the vehicle A and the vehicle B are coupled at a position where communication target occupants can easily communicate with each other.

For example, when it is determined that a communication target occupant with the occupant CA of the vehicle A is the occupant PB2 of the vehicle B using the selection screen 24B, the movement planning unit 223C prepares a movement plan in which the vehicle A and the vehicle B are coupled at a position where the occupant CA and the occupant PB2 can easily communicate with each other.

Figure 15:
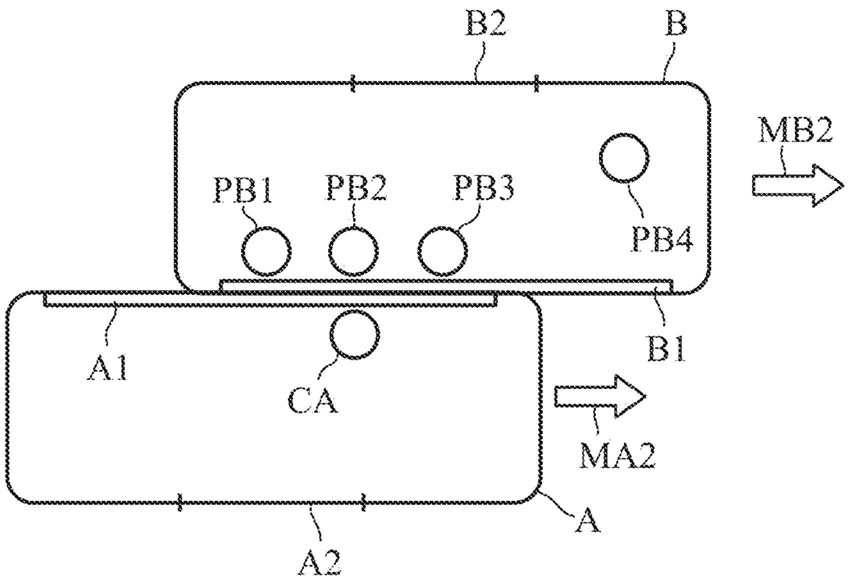
FIG. 15 is an explanatory diagram illustrating internal situations of coupled vehicles in the third embodiment.

The movement control unit 224 couples the vehicle A and the vehicle B by outputting mobile body control information for moving the vehicle A and the vehicle B to the vehicle A and the vehicle B in accordance with the movement plan prepared by the movement planning unit 223C. FIG. 15 is an explanatory diagram illustrating an outline of the coupled vehicle A and vehicle B in the third embodiment. For example, as illustrated in FIG. 15, the vehicle A and the vehicle B are coupled at a position where the occupant CA and the occupant PB2 face each other, and therefore the occupant CA and the occupant PB2 can directly communicate with each other.

Figure 16:
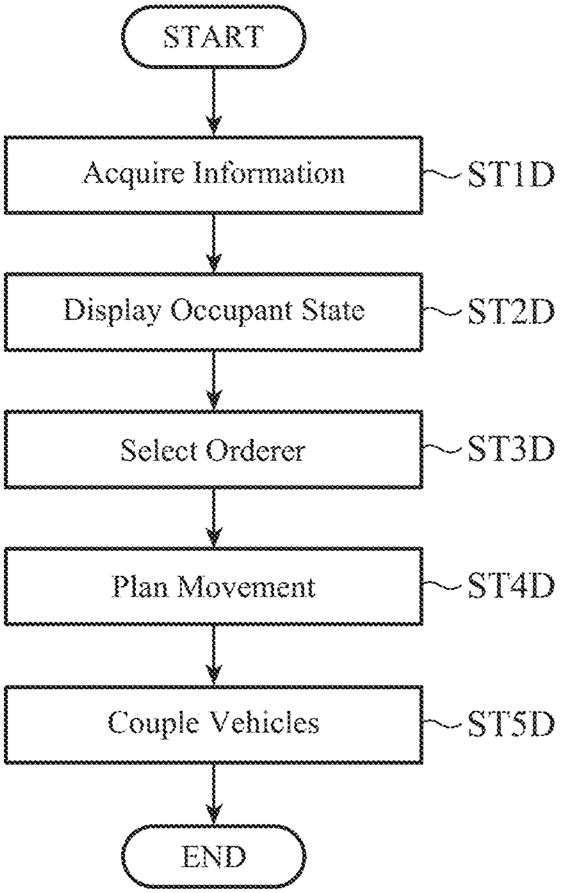
FIG. 16 is a flowchart illustrating an information processing method according to the third embodiment.

FIG. 16 is a flowchart illustrating an information processing method according to the third embodiment.

The information acquisition unit 221 acquires mobile body position information of the vehicle A and the vehicle B and occupant detection information of states of occupants of the vehicle A and the vehicle B (step ST1D).

The determination unit 222B determines the states of the occupants of the vehicle A and the vehicle B on the basis of the occupant detection information (step ST2D). At this time, the determination unit 222B specifies an occupant who receives provision of a service from the service server 7 among occupants of the vehicle B on the basis of service information acquired by the information acquisition unit 221.

The display processing unit 225A causes the display unit 24 to display the selection screen 24B on the basis of the state of the occupant of the vehicle B. The occupant of the vehicle A selects an occupant (orderer) from the selection screen 24B using the operation unit 25 (step ST3D). The determination unit 222B determines that the occupant selected from the selection screen 24B is a communication target. Here, it is assumed that the occupant PB2 is determined to be a communication target with the occupant CA.

The movement planning unit 223C prepares a movement plan of mobile bodies to be coupled at a position where the communication target occupants can easily communicate with each other (step ST4D).

The movement control unit 224 couples the vehicle A and the vehicle B by outputting mobile body control information for moving the vehicle A and the vehicle B in accordance with the movement plan to the vehicle A and the vehicle B (step ST5D). As a result, the communication target occupants are located at positions where the communication target occupants can easily communicate with each other when the vehicle A and the vehicle B are coupled, and therefore the occupants can directly communicate with each other between the vehicle A and the vehicle B.

Figure 17:
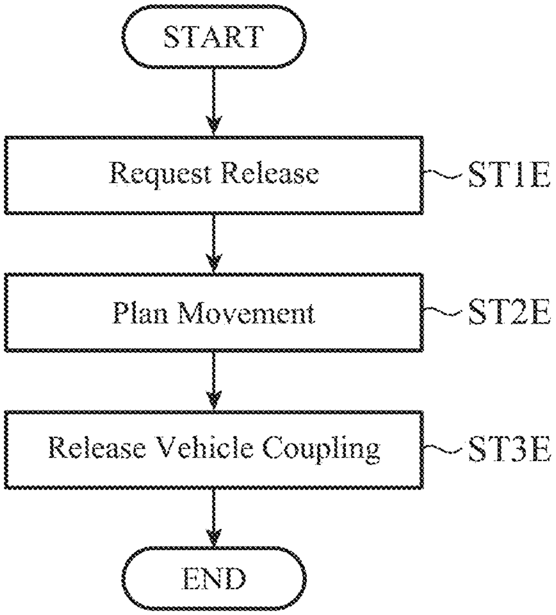
FIG. 17 is a flowchart illustrating vehicle coupling release processing in the third embodiment.

FIG. 17 is a flowchart illustrating vehicle coupling release processing in the third embodiment.

The display processing unit 225 causes the display unit 24 to display the selection screen 24B.

By pressing the button image 24B-3 described as "release" on the selection screen 24B using the operation unit 25, an occupant of the vehicle A requests releasing the coupling between the vehicle A and the vehicle B (step ST1E).

When receiving the request for releasing the coupling between the vehicle A and the vehicle B, the movement planning unit 223C prepares a movement plan for releasing the coupling between the vehicle A and the vehicle B (step ST2E).

The movement control unit 224 generates mobile body control information for releasing the coupling in accordance with the movement plan, and outputs the generated mobile body control information to the vehicle control devices 5 of the vehicle A and the vehicle B. The vehicle control devices 5 control traveling of the vehicle A and the vehicle B in such a manner that the coupling between the vehicle A and the vehicle B is released on the basis of the mobile body control information (step ST3E).

As a result, the coupling between the vehicle A and the vehicle B can be released in response to the coupling release request.

In the information processing device 2C according to the third embodiment, the information acquisition unit 221 acquires service information regarding a specific service whose provision is requested by an occupant. The display processing unit 225A outputs display control information for causing a selection screen to display an occupant who has requested a service as a selection target candidate together with the service information to the display unit 24. As a result, the information processing device 2C can select an occupant who has requested provision of a specific service using the selection screen 24B. In addition, the communication target occupants are located at positions where the communication target occupants can easily communicate with each other when the vehicle A and the vehicle B are coupled, and therefore in the information processing device 2C, the occupants can directly communicate with each other between the vehicle A and the vehicle B.

Note that the embodiments can be freely combined to each other, any component in each of the embodiments can be modified, or any component in each of the embodiments can be omitted.

INDUSTRIAL APPLICABILITY

The information processing device according to the present disclosure can be used for, for example, a service in which occupants exchange articles between self-driving vehicles.

REFERENCE SIGNS LIST

1, 1A to 1C: mobile body control system, 2, 2A to 2C: information processing device, 3: network, 4: sensor group, 5: vehicle control device, 6: communication device, 7: service server, 8: orderer terminal, 21: communication unit, 22, 22A to 22C: calculation unit, 23: storage unit, 24: display unit, 24A, 24B: selection screen, 24A-1 to 24A-4, 24B-1 to 24B-4: image, 25: operation unit, 100: communication interface, 101: input and output interface, 102: processor, 103: memory, 221, 221A: information acquisition unit, 222, 222A, 222B: determination unit, 223, 223B, 223C: movement planning unit, 224, 224A: movement control unit, 225, 225A: display processing unit

The invention claimed is:

1. An information processing device to control coupling between mobile bodies, comprising:

processing circuitry configured to acquire mobile body position information of the mobile bodies and occupant detection information of states of occupants in the mobile bodies;

determine communication target occupants from among the occupants in each of the mobile bodies on a basis of the occupant detection information;

prepare a movement plan in which the mobile bodies are coupled at a passenger position where the communication target occupants face each other or face diagonally; and couple the mobile bodies by outputting mobile body control information for moving the mobile bodies in accordance with the movement plan to the mobile bodies.

2. The information processing device according to claim 1, wherein the processing circuitry acquires detection information of at least one of positions of the occupants, face directions of the occupants, and gestures performed by the occupants in the mobile bodies, and the processing circuitry determines the communication target occupants on a basis of at least one of the positions of the occupants, the face directions of the occupants, and the gestures performed by the occupants in the mobile bodies.

3. The information processing device according to claim 1, wherein the processing circuitry is further configured to output display control information for displaying a selection screen for selecting at least one of the communication target occupants to a display, and determine that an occupant selected using the selection screen displayed on the display is the at least one of the communication target occupants.

4. The information processing device according to claim 3, wherein the processing circuitry is configured to acquire service information regarding a specific service whose provision is requested by an occupant, and output the display control information for causing the selection screen to display the occupant who has requested the service as a selection target candidate together with the service information to the display.

5. A mobile body control system comprising:

a plurality of mobile bodies moving on a basis of mobile body control information; and the information processing device according to claim 1.

6. The information processing device according to claim 1, wherein the processing circuitry is configured to couple three or more mobile bodies at a passenger position where the communication target occupants face each other or face diagonally.

7. The information processing device according to claim 1, wherein the movement plan includes a movement plan in which the mobile bodies are physically coupled to each other.

8. The information processing device according to claim 1, wherein the passenger position at which the communication target occupants face diagonally is a position where the communication target occupants face each other obliquely while deviating from a position where the communication target occupants face each other directly within a range not interfering with communication.

9. The information processing device according to claim 1, wherein the processing circuitry is further configured to determine, on a basis of the occupant detection information, whether communication between the communication target occupants has ended and, when communication has ended, prepare a movement plan for releasing coupling between the mobile bodies.

10. The information processing device according to claim 9, wherein the processing circuitry is configured to determine that communication between the communication target occupants has ended when the occupant detection information indicates that one of the communication target occupants has moved away from a coupling position, has turned a back to another of the communication target occupants, or has begun talking to another occupant.

11. The information processing device according to claim 3, wherein on the selection screen, an occupant present in a vicinity of a coupling portion of one of the mobile bodies has a display mode different from a display mode of an occupant not in a vicinity of the coupling portion.

12. An information processing method performed with an information processing device to control coupling between mobile bodies, the method comprising:

acquiring mobile body position information of the mobile bodies and occupant detection information of states of occupants in the mobile bodies;

determining communication target occupants from among the occupants in each of the mobile bodies on a basis of the occupant detection information;

preparing a movement plan in which the mobile bodies are coupled at a passenger position where the communication target occupants face each other or face diagonally; and coupling the mobile bodies by outputting mobile body control information for moving the mobile bodies in accordance with the movement plan to the mobile bodies.

* * * * *